United States Patent [19]

Nomura et al.

[11] Patent Number: 5,451,245
[45] Date of Patent: Sep. 19, 1995

[54] PROCESS FOR PRODUCING MAGNETIC METAL PARTICLES

[75] Inventors: Eiji Nomura; Toshihiko Kawamura; Kenji Hatanaka; Nariaki Moriyama, all of Yokkaichi, Japan

[73] Assignee: Ishihara Sangyo Kaisha, Ltd., Japan

[21] Appl. No.: 205,562

[22] Filed: Mar. 4, 1994

[30] Foreign Application Priority Data

Mar. 8, 1993 [JP] Japan .................. 5-072917
Mar. 26, 1993 [JP] Japan .................. 5-092069

[51] Int. Cl.$^6$ .................. B22F 9/20; H01F 1/20
[52] U.S. Cl. .................. 75/348; 75/349; 148/105
[58] Field of Search .................. 75/348, 344; 148/104, 148/105

[56] References Cited

U.S. PATENT DOCUMENTS 4,390,361 6/1983 Sueyoshi et al. .................. 75/348
5,185,093 2/1993 Ichikawa et al. .................. 75/349

FOREIGN PATENT DOCUMENTS 0278028 8/1988 European Pat. Off. .
0436041 7/1991 European Pat. Off. .
57-5804 1/1982 Japan .
58-93806 6/1983 Japan .
62-156209 7/1987 Japan .................. 148/105
64-57701 3/1989 Japan .
1298106 12/1989 Japan .
2298004 12/1990 Japan .

*Primary Examiner*—George Wyszomierski
*Attorney, Agent, or Firm*—Cushman Darby & Cushman

[57] ABSTRACT

Acicular magnetic iron particles comprising acicular iron substrate particles having first layer consisting of at least one of hydrous oxides and anhydrous oxides of aluminum and zirconium and mixtures thereof and second layer consisting of hydrous oxides and anhydrous oxides of aluminum and mixtures thereof coated on the surfaces of the particles are produced by coating the surfaces of hydrated iron oxide particles as substrate with at least one of aluminum compounds and zirconium compounds, then heating the coated substrate particles to convert to hematite particles, thereafter coating the surfaces of the resultant hematite substrate particles with at least one of aluminum compounds, and then reducing under heat the coated hematite particles.

18 Claims, No Drawings

PROCESS FOR PRODUCING MAGNETIC METAL PARTICLES

BACKGROUND OF THE INVENTION

1. Field of the Invention

The present invention relates to a process for producing magnetic metal particles suitable for magnetic recording mediums.

2. Description of Related Art

In recent years, magnetic recording mediums have been more increasingly required to be improved so as to have higher recording density and higher performance. As associated with such a trend, an increasing interest has been directed to iron or iron-based magnetic metal particles (referred to as magnetic metal particles hereunder) having higher saturation magnetization and higher coercive force than those of acicular magnetite and maghemite, even compared with those of cobalt modified magnetic iron oxides of the magnetite and maghemite, as magnetic particles to be used in magnetic recording mediums. The magnetic metal particles have greater promise for use in higher performance magnetic recording mediums such as high image quality video tapes for HDTV in recent years and high recording density disks as well as for practical use in digital audio tapes and 8 mm video tapes.

There has been recently a need for fine magnetic metal particles useful for high performance magnetic recording mediums in the acicular form of uniform size normally having a largest dimension of about 0.3 $\mu$m, or even no larger than 0.2 $\mu$m which do not contain any sintered agglomerates and which are more excellent in dispersibility in magnetic paint systems, orientability and filling property in magnetic coating films with the paint systems, and flatness of the coatings. Above all, for the purpose of providing a recording medium having a higher output level with a reduction in the noise level attributable to particle size, further ultra-fine particles have been required so that an increasing attention has been directed to acicular magnetic metal particles of smaller size having excellent magnetic properties and aging stability.

Magnetic metal particles have been produced generally by a method where hydrated iron oxides of the acicular form such as goethite are dehydrated under heat to produce iron oxide particles such as hematite which are reduced under heat in a reducing gaseous atmosphere such as hydrogen to produce magnetic metal particles. However, the thermal process, especially the reduction step, tends to cause sintering of particles and deformation of particle shape. Such deformation of particle shape and the coarsening of $\alpha$-Fe crystalline particles impair significantly magnetic characteristics of the end magnetic metal particles. This has an influence on the production of fine magnetic metal particles in the manner that the finer the starting material, hydrated iron oxide particles, the greater the tendency of deformation of particle shape, making it difficult to achieve the desired levels of magnetic characteristics and aging stability.

Various techniques have been proposed heretofore to overcome the aforementioned problems. For example, one of well known techniques comprises treating the surfaces of the hydrated iron oxide particles and iron oxide particles with so-called shape-retaining agents such as silicon compounds, boron compounds, aluminum compounds and zirconium compounds, and thereafter dehydrating the treated particles under heat to reduce them.

Although the aforementioned treatment, for example, with silicon compounds, boron compounds and phosphorus compounds results in desired effects of preventing the sintering and the deformation of particle shape to facilitate the production of magnetic metal particles having good magnetic characteristics, it tends to inhibit proceeding of the reduction or impair the dispersibility in the course of the production of magnetic recording mediums so that adverse affections on magnetic characteristics, audio and video characteristics of the magnetic recording mediums may be observed.

With aluminum compounds, a good compatibility of the treated particles with paint resins and solvents to be used for the production of magnetic recording mediums results in desired effects in dispersibility. However, the aluminum compounds are likely to be taken into the particle matrix during the thermal dehydration treatment so that a reduction-inhibiting action may occur, or the effects of preventing sintering and retaining particle form may be diminished in the course of the thermal reduction.

On the other hand, with zirconium compounds, though the effects of preventing the sintering and deformation of shape as described above can be achieved to some degree, optimization of the effects requires increasing the amount of zirconium compounds to be deposited, which in turn tends to prevent the proceeding of the reaction in the reduction treatment process and diminish the magnetic characteristics such as saturation magnetization of the produced magnetic metal particles. At any rate, not a few problems remain to be solved.

SUMMARY OF THE INVENTION

An object of the present invention is to provide a process for producing magnetic metal particles having a compatibility of magnetic characteristics and dispersibility.

That is, the present invention provides a process for producing acicular magnetic iron particles comprising the steps of firstly coating the surfaces of hydrated iron oxide particles with at least one of aluminum compounds and zirconium compounds, then heating the coated substrate particles to convert to hematite particles, thereafter secondly coating the resultant hematite particles with at east one of aluminum compounds, and then reducing under heat the coated particles.

DETAILED DESCRIPTION OF PREFERRED EMBODIMENTS

The present inventors have been made an intensive research to optimize the aforementioned treatment conditions for the purpose of solving the problems encountered in the production of magnetic metal particles as described above. As a result, it has been found that the existing of a specific shape-retaining agent on the surfaces of the particles of material to be thermally dehydrated, hydrated iron oxides and material to be thermally reduced, hematite and the careful control of their amounts and conditions are extremely important for production of magnetic metal particles with the compatibility of magnetic characteristics and dispersibility. The present invention has been completed on the basis of such findings.

Typical hydrated iron oxides to be used in the present invention include hydrated oxides of iron as a main metal such as $\alpha$-FeOOH (goethite), $\gamma$-FeOOH (lepidocrocite), and $\beta$-FeOOH. The aforementioned acicular oxyhydroxides have preferably an average length of 0.1 to 0.6 $\mu$m, an aspect ratio of 3 to 30 and preferably a specific surface area of 50 to 150 m$^2$/g. These hydrated iron oxides may contain various components for shape-controlling agents and reduction promoting agents, for example, compounds of cobalt, nickel, copper, silver, phosphorus, zinc, manganese, magnesium, boron, aluminum, silicon and the like, if necessary.

According to the present invention, hydrated iron oxide substrate particles are treated to coat the surfaces thereof with at least one compound selected from the group consisting of aluminum compounds and zirconium compounds by any one of known techniques. For example, to an aqueous dispersion of hydrated iron oxides, there is added a solution of aluminum sulfate, aluminum chloride, sodium aluminate, aluminum acetate, aluminum alkoxides, alkyl aluminum, zirconium oxycarbonate, zirconyl ammonium carbonate, zirconium oxychloride, zirconium oxysulfate, zirconium acetate, zirconium stearate, zirconium tetra-n-butoxide, zirconium acetylacetate, or the like, to effect neutralization and hydrolysis, thereby precipitating oxides and/or hydrated oxides of aluminum and zirconium on the surfaces of the hydrated iron oxide particles, or added an alumina sol to mix and deposit on the particle surfaces.

In the coating treatment, the amounts of aluminum compounds and zirconium compounds to be deposited are 0.1 to 10% by weight, desirably 0.5 to 8% by weight for aluminum expressed as Al/Fe based on the iron amount in the particulate hydrated iron oxide substrate and 0.05 to 10% by weight, desirably 0.1 to 5% by weight for zirconium expressed as Zr/Fe based on the same iron amount in the particulate hydrated iron oxide substrate. Lower amounts to be deposited than the defined ranges can not achieve desired effects, while higher amounts than the defined ranges result in longer period of time required for the reduction into the end products, a decrease in saturation magnetization of the end products, and moreover, result in trapping of the aluminum compounds and zirconium compounds, when used, into the particle matrix during the thermal dehydration treatment, as described above, which compounds are liable to be released in the course of the subsequent reduction treatment resulting easily in reduced densification of the resultant magnetic metal particles and inevitably in a loss of magnetic characteristics.

In order to further enhance the shape-retaining property during heat-treatment, silicon compounds, phosphorus compounds and boron compounds may be used in combination with the aluminum and zirconium compounds at the time of the coating treatment onto the hydrated iron oxide particles. In this case, the amount of each compound to be deposited is in the range of 0.05 to 10% by weight, desirably 0.1 to 5% by weight expressed by M/Fe where M represents a total of Al, Zr, Si, P and B, based on the amount of iron in the hydrated iron oxide substrate particles.

Moreover, in the step of the coating treatment onto the hydrated iron oxide particles, any one of reduction-promoting agents such as compounds of cobalt, nickel, copper, and silver may be codeposited.

According to the present invention, the hydrated iron oxide particles, the surfaces of which have been subjected to the coating treatment, are separated from the dispersion liquid, and then heated at a temperature of 300 to 850° C., desirably 350 to 800° C., more desirably 450 to 750° C. in a non-reducing atmosphere, for example, in air, or in an atmosphere of inert gas to dehydrate the particles, thereby converting into hematite ($\alpha$-Fe$_2$O$_3$). Heat-treatment temperatures outside the defined ranges may cause diminishing of the effects of remarkably preventing the sintering of particles and the deformation of particle shape of the end products, and in addition may cause insufficient densification of the end products.

According to the present invention, the particulate hematite substrate obtained as described above may be subjected to the coating treatment with aluminum compounds by any one of known techniques. For example, to an aqueous dispersion of hematite particles, there are added a solution of at least one of acidic salts such as aluminum sulfate, aluminum chloride, aluminum acetate, and the like, and basic aluminum salts such as sodium aluminate and the like together with an alkali or acid to effect neutralization, or a solution of at least one of organic aluminum compounds such as aluminum alkoxides, alkyl aluminum and the like is hydrolyzed to precipitate hydrated aluminum oxides on the surfaces of the hematite particles, or added an alumina sol to mix and deposit on the particle surfaces. In such coating treatment, the amounts of hydrated aluminum oxides to be deposited are 0.05 to 10% by weight, desirably 0.1 to 8% by weight, more desirably 0.5 to 5% by weight for aluminum expressed as Al/Fe based on the iron amount in the hematite substrate. The amount of aluminum to be deposited in the second coating treatment process relative to the amount of iron in the hematite particles is in the range of 5 to 95% by weight, desirably 10 to 90% by weight based on the total of the amount of all the metal elements deposited on the hydrated oxides [relative to the amount of iron in the hydrated iron oxide particles] and the amount of all the metal elements deposited on the hematite particles (relative to the amount of iron in the hematite particles). Lower amounts than the defined range of aluminum to be deposited may not achieve the desired effects, while higher amounts may result in requiring a longer period of time for the reduction into the end products or a decrease in saturation magnetization of the end products.

More desirable effects may be achieved by additionally coating at least one of silicon compounds, phosphorus compounds, zirconium compounds and boron compounds on the surfaces of the hematite substrate particles before, after, or simultaneously with the coating treatment thereof with aluminum compounds, if necessary. In this case, the amount of each compound to be deposited relative to the amount of iron in the particulate hematite substrate is in the range of 0.05 to 10% by weight, desirably 0.1 to 5% by weight expressed by (Al+M)/Fe where Al represents the amount of aluminum to be deposited on the hematite particles, and M represents the total amount of Si, P, Zr, and B to be deposited.

The silicon compounds to be used include, for example, sodium orthosilicate, sodium metasilicate, and water glass. The phosphorus compounds to be used include, for example, phosphoric acids such as phosphoric acid, pyrophosphoric acid, tripolyphosphoric acid, hexametaphosphoric acid, and polyphosphoric acid, and salts thereof such as sodium, potassium, ammonium, calcium and magnesium salts of those acids. It is desirable in industry to use phosphoric acid, sodium dihydrogen phosphate, disodium hydrogen phosphate, ammonium dihydrogen phosphate, and diammonium hydrogen phosphate. The boron compounds to be used include, for example, boric acid compounds such as boric acid, boron oxide, sodium borate (borax), ammonium borate, magnesium borate, manganese borate, zinc borate, and aluminum borate. The use of boric acid and sodium borate (borax) is desirable in industry.

Moreover, in the step of the coating treatment onto hematite particles, any one of reduction-promoting agents such as compounds of cobalt, nickel, copper, and silver may be codeposited.

The hematite particles which have been treated by coating with the aluminum compounds and the like are separated from the dispersion liquid, then washed, dried, and further pelleted before or after the drying, if necessary, and thereafter reduced under heat to produce the end products of the present invention.

Prior to the thermal reduction treatment, a heat-treatment at a temperature of 300 to 850° C., desirably 450 to 750° C. in a non-reducing atmosphere, for example, in air or in an atmosphere of inert gas may lead to more preferred results. This may be presumed to be due to the fact that the heat-treatment allows the coating films formed by the coating treatment with the aluminum compounds and the like to be uniform and densified, thereby facilitating the development of the desired effects. If the heat-treatment temperatures are higher than the defined range, hematite particles are liable to sinter or deform their shape, while lower heat-treatment temperatures than the defined range may cause insufficient uniformity and densification of the end products making it difficult to achieve the desired effects.

The reduction treatment of the aforementioned coated hematite particles into magnetic metal particles according to the present invention may be accomplished by any one of known techniques. Substantially all the iron oxides can be reduced into metal iron by treating at a temperature of 350 to 600° C. in an atmosphere of reducing gas, generally hydrogen gas. Before the thus reduced magnetic metal particles are removed out into atmosphere, they are generally subjected to stabilizing treatment by any one of various known methods. For example, stabilization of the particles may be achieved by a method where after immersing the particles in an organic solvent such as toluene, the solvent is evaporated, or a method where an oxygen-containing gas is blown into the liquid phase of toluene or the like containing the particles, or a method where an oxygen-containing gas is contacted with the particles in a gas phase, or a combination of these methods with a coating treatment onto the particles for inhibiting oxidation using various compounds.

The thus produced magnetic metal particles according to the present invention are excellent in coercive force, squareness, orientability, saturation magnetization (packing property), switching field distribution, as well as in gloss value of tape.

As described above, the present invention enables production of the hematite particles having a good shape and minimum trapping of aluminum compounds in the particle matrix, whereby separation of the aluminum compounds in the reduction process is minimized rendering the produced magnetic metal particles highly dense and good in shape. In addition the treatment of the hematite particles with aluminum compounds facilitate the formation of a dense and abundant aluminum distributed coating layer on the surfaces of the particles, which layer is suitable for achieving dispersion in the production of the magnetic mediums, and thus it is presumed that a higher dispersibility and a higher performance with magnetic characteristics would be realized.

The present invention will be further described with reference to the following Examples.

Example 1

200 grams of acicular goethite particles (Specific surface area=80 $m^2$/gr.; Average length=0.25 $\mu$m; Average width=0.01 $\mu$m) were dispersed in 6 liters of water and maintained at a temperature of 30° C. 62.9 milliliters of an aqueous solution of nickel chloride (20 gr./liter expressed as Ni) were added and adjusted to pH 8 in one hour with an ammonia water. Thereafter, 189 milliliters of an aqueous solution of sodium aluminate (20 gr./liter expressed as Al) were added, then hydrochloric acid was added to adjust the pH to 8 in one hour, the resultant dispersion was maintained for one hour, thus the first coating treatment was conducted, and thereafter the resultant particles were filtrated, washed with water and dried. The particles were dehydrated and calcined at 600° C. in air to convert into hematite particles which were dispersed in water with a mixer to produce a dispersion. To the dispersion, 126 milliliters of an aqueous solution of sodium aluminate (20 gr./liter expressed as Al) were added, then the pH was adjusted to 8 with hydrochloric acid in one hour, the resultant dispersion was maintained for one hour, thus the second coating treatment was conducted, and thereafter the resultant particles were filtrated, washed with water and dried. An aliquot of 50 grams was placed in a reduction vessel and reduced under a flow of hydrogen at a rate of 10 liters/minute at 400° C. The thus produced end magnetic metal particles were immersed in toluene and dried in air and removed out in atmosphere.

Example 2

After coating hydrated iron oxide particles with nickel in the same manner as in Example 1, 31.5 milliliters of an aqueous solution of sodium aluminate (20 gr./liter expressed as Al) were added, then hydrochloric acid was added to adjust the pH to 8 in one hour, the resultant dispersion was maintained for one hour, thus the first coating treatment was conducted, and thereafter the resultant particles were filtrated, washed with water and dried. The particles were dehydrated and calcined at 600° C. in air to convert into hematite particles which were dispersed in water with a mixer to produce a dispersion. To the dispersion, 283 milliliters of an aqueous solution of sodium aluminate (20 gr./liter expressed as Al) were added, then the pH was adjusted to 8 with hydrochloric acid in one hour, the resultant dispersion was maintained for one hour, thus the second coating treatment was conducted. The remainder of the process identical to that in Example 1 was repeated to produce the end magnetic metal particles.

Example 3

200 grams of acicular goethite particles (Specific surface area=100 $m^2$/gr.; Average length=0.20 $\mu$m; Average width=0.008 $\mu$m) were dispersed in 6 liters of water and maintained at a temperature of 30° C. 62.9 milliliters of an aqueous solution of nickel chloride (20 gr./liter expressed as Ni) were added and adjusted to pH 8 in one hour with an ammonia water. Thereafter, 189 milliliters of an aqueous solution of sodium aluminate (20 gr./liter expressed as Al) and 126 milliliters of an aqueous solution of sodium orthosilicate (10 gr./liter expressed as Si) were added, then hydrochloric acid was added to adjust the pH to 8 in one hour, the resultant dispersion was maintained for one hour, thus the first coating treatment was conducted, and thereafter the resultant particles were filtrated, washed with water and dried. The particles were dehydrated and calcined at 600° C. in air to convert into hematite particles which were dispersed in water with a mixer to produce a dispersion. To the dispersion, 126 milliliters of an aqueous solution of sodium aluminate (20 gr./liter expressed by Al) were added, then the pH was adjusted to 8 with hydrochloric acid in one hour, the resultant dispersion was maintained for one hour, thus the second coating treatment was conducted, and thereafter the resultant particles were filtrated, washed with water and dried. An aliquot of 50 grams from the produced particles was placed in a reduction vessel and reduced under a flow of hydrogen at a rate of 10 liters/minute at 400° C. The thus produced end magnetic metal particles were immersed in toluene and dried in air and removed out in atmosphere.

Example 4

After the coating treatment of hydrated iron oxide particles with nickel in the same manner as in Example 3, 31.5 milliliters of an aqueous solution of sodium phosphate (20 gr./liter expressed as P) and 189 milliliters of an aqueous solution of sodium aluminate (20 gr./liter expressed as Al) were added, then hydrochloric acid was added to adjust the pH to 8 in one hour, the resultant dispersion was maintained for one hour, thus the first coating treatment was conducted. The remainder of the process identical to that in Example 3 was repeated to produce the end magnetic metal particles.

Example 5

After the coating treatment of hydrated iron oxide particles with nickel in the same manner as in Example 1, 189 milliliters of an aqueous solution of zirconyl ammonium carbonate (20 gr./liter expressed as Zr) instead of an aqueous solution of sodium aluminate were added, then hydrochloric acid was added to adjust the pH to 8 in one hour, the resultant dispersion was maintained for one hour, thus the first coating treatment was conducted, and thereafter the resultant particles were filtrated, washed with water and dried. The particles were dehydrated and calcined at 600° C. in air to convert into hematite particles which were dispersed in water with a mixer to produce a dispersion. To the dispersion, 126 milliliters of an aqueous solution of sodium aluminate (20 gr./liter expressed as Al) were added, then the pH was adjusted to 8 with hydrochloric acid in one hour, the resultant dispersion was maintained for one hour, thus the second coating treatment was conducted. The remainder of the process identical to that in Example 1 was conducted to produce the end magnetic metal particles.

Example 6

After the coating treatment of hydrated iron oxide particles with nickel in the same manner as in Example 1, 189 milliliters of an aqueous solution of zirconyl ammonium carbonate (20 gr./liter expressed as Zr) and 63 milliliters of an aqueous solution of sodium aluminate (20 gr./liter expressed as Al) were added, then hydrochloric acid was added to adjust the pH to 8 in one hour, the resultant dispersion was maintained for one hour, thus the first coating treatment was conducted, and thereafter the resultant particles were filtrated, washed with water and dried. The particles were dehydrated and calcined at 600° C. in air to convert into hematite particles which were dispersed in water with a mixer to produce a dispersion. To the dispersion, 126 milliliters of an aqueous solution of sodium aluminate (20 gr./liter expressed as Al) were added, then the pH was adjusted to 8 with hydrochloric acid in one hour, the resultant dispersion was maintained for one hour, thus the second coating treatment was conducted. The remainder of the process identical to that in Example 1 was conducted to produce the end magnetic metal particles.

Example 7

After the coating treatment of hydrated iron oxide particles with nickel compounds and zirconium compounds in the same manner as in Example 5, 31.5 milliliters of an aqueous solution of sodium silicate (20 gr./liter expressed as Si) were added, then hydrochloric acid was added to adjust the pH to 8 in one hour, thereafter the resultant dispersion was maintained for one hour, thus the first coating treatment of the hydrated iron oxide particles was conducted. The remainder of the process identical to that in Example 5 was repeated to produce the end magnetic metal particles.

Example 8

After the coating treatment of hydrated iron oxide particles with nickel compounds and zirconium compounds in the same manner as in Example 5, 31.5 milliliters of an aqueous solution of sodium phosphate (20 gr./liter expressed as P) were added, then hydrochloric acid was added to adjust the pH to 8 in one hour, thereafter the resultant dispersion was maintained for one hour, thus the first coating treatment of the hydrated iron oxide particles was conducted. The remainder of the process identical to that in Example 5 was carried out to produce the end magnetic metal particles.

Example 9

After the coating treatment of hydrated iron oxide particles with nickel compounds and zirconium compounds in the same manner as in Example 5, 31.5 milliliters of an aqueous solution of sodium borate (20 gr./liter expressed as B) were added, then hydrochloric acid was added to adjust the pH to 8 in one hour, thereafter the resultant dispersion was maintained for one hour, thus the first coating treatment of the hydrated iron oxide particles was conducted. The remainder of the process identical to that in Example 5 was carried out to produce the end magnetic metal particles.

Example 10

The procedure of Example 5 was repeated, except that in the coating treatment of the hematite particles with aluminum compounds, 63 milliliters of an aqueous solution of sodium aluminate (20 gr./liter expressed as Al) and 63 milliliters of an aqueous solution of sodium orthosilicate (20 gr./liter expressed as Si) were added, to produce the end magnetic metal particles.

Example 11

The procedure of Example 5 was repeated, except that in the coating treatment of the hematite particles with aluminum compounds, 63 milliliters of an aqueous solution of sodium aluminate (20 gr./liter expressed as Al) and 63 milliliters of an aqueous solution of sodium phosphate (20 gr./liter expressed as P) were added, to produce the end magnetic metal particles.

Example 12

The procedure of Example 5 was repeated, except that in the coating treatment of the hematite particles with aluminum compounds, 63 milliliters of an aqueous solution of sodium aluminate (20 gr./liter expressed as Al) and 63 milliliters of-an aqueous solution of sodium borate (20 gr./liter expressed as B) were added, to produce the end magnetic metal particles.

Example 13

The procedure of Example 5 was repeated, except that before the thermal reduction, the coated hematite particles were heated at 600° C. for two hours in an atmosphere of nitrogen, to produce the end magnetic metal particles.

Example 14

The procedure of Example 7 was repeated, except that before the thermal reduction, the coated hematite particles were heated at 600° C. for two hours in an atmosphere of nitrogen, to produce the end magnetic metal particles.

Example 15

The procedure of Example 10 was repeated, except that before the thermal reduction, the coated hematite particles were heated at 600° C. for two hours in an atmosphere of nitrogen, to produce the end magnetic metal particles.

Comparative Example 1

The procedure of Example 1 was repeated, except that in the first coating treatment, the amount of the aqueous solution of sodium aluminate to be added was changed to 315 milliliters, and that the second coating treatment was not conducted, to produce contrast magnetic metal particles.

Comparative Example 2

The procedure of Example 1 was repeated, except that in the first coating treatment, no aluminum compound was coated, and that in the second coating treatment, the amount of the aqueous solution of sodium aluminate to be added was changed to 315 milliliters, to produce contrast magnetic metal particles.

Comparative Example 3

The procedure of Example 1 was repeated, except that after the first coating treatment, the dehydration and calcination treatment was changed to the reduction at 400 under a flow of hydrogen to produce magnetite particles which were subjected to the second coating treatment, to produce contrast magnetic metal particles.

Comparative Example 4

The procedure of Example 3 was repeated, except that in the first coating treatment, the coating treatment with silicon compounds was not performed, and that the second coating treatment was conducted with 251 milliliters of an aqueous solution of sodium orthosilicate (10 gr./liter expressed as Si) instead of the aqueous solution of sodium aluminate, to produce contrast magnetic metal particles.

Comparative Example 5

The procedure of Example 5 was repeated, except that in the first coating treatment of the hydrated iron oxide particles, instead of the coating with zirconium compounds, 126 milliliters of an aqueous solution of sodium aluminate (20 gr./liter expressed as Al) were added and that in the second coating treatment of the hematite particles, instead of the coating with the aluminum compounds, 189 milliliters of an aqueous solution of zirconium oxychloride (20 gr./liter expressed as Zr) were added and sodium hydroxide was added to adjust the pH to 8, to produce contrast magnetic metal particles.

Comparative Example 6

The procedure of Example 5 was repeated, except that in the first coating treatment of the hydrated iron oxide particles with zirconium compounds, 189 milliliters of an aqueous solution of zirconium oxychloride (20 gr./liter expressed as Zr) and 126 milliliters of an aqueous solution of sodium aluminate (20 gr./liter expressed as Al) were added and that the second coating treatment of the hematite particles was not performed, to produce contrast magnetic metal particles.

Comparative Example 7

The procedure of Example 5 was repeated, except that the first coating treatment of the hydrated iron oxide particles with zirconium compounds was not performed and that in the second coating treatment of the hematite particles, 126 milliliters of an aqueous solution of sodium aluminate (20 gr./liter expressed as Al) and 189 milliliters of an aqueous solution of zirconium oxychloride (20 gr./liter expressed as Zr) were added in parallel and simultaneously, to produce contrast magnetic metal particles.

Each sample of the magnetic metal particles obtained in the aforementioned Examples and Comparative Examples was evaluated for magnetic characteristics by ordinary techniques. Moreover, those samples were used to manufacture magnetic tapes by conventional methods. Magnetic paints were prepared by mixing and dispersing the following formulations and coated to produce dry paint film thickness of 10 $\mu$m. The manufactured magnetic tapes were also evaluated for magnetic characteristics.

| | |
|---|---|
| Magnetic particles | 5.00 parts by weight |
| Dispersant | 0.25 parts by weight |
| Polyurethane resin | 2.96 parts by weight |
| Mixed solvent* | 13.40 parts by weight |

*Toluene/MEK/cyclohexane (4.5/4.5/1)

Measurements of magnetic characteristics, coercive force (Hc : Oe), saturation magnetization ($\sigma$s : emu/g), squareness (Rs, SQ), orientation ratio (OR), and switching field distribution (SFD), and for magnetic tapes, 60° gloss values measured with a gloss meter are set forth in Tables 1 and 2.

TABLE 1

| Example | Particle characteristics | | | Tape characteristics | | | | |
|---|---|---|---|---|---|---|---|---|
| | Hc (Oe) | σs (emu/g) | Rs | Hc (Oe) | SQ | OR | SFD | Gloss |
| 1 | 1570 | 133.2 | 0.503 | 1561 | 0.819 | 1.92 | 0.49 | 122 |
| 2 | 1502 | 128.3 | 0.502 | 1555 | 0.807 | 1.84 | 0.52 | 125 |
| 3 | 1578 | 123.0 | 0.503 | 1622 | 0.810 | 1.80 | 0.52 | 117 |
| 4 | 1590 | 120.9 | 0.514 | 1629 | 0.807 | 1.79 | 0.52 | 113 |
| 5 | 1528 | 135.6 | 0.511 | 1587 | 0.825 | 2.19 | 0.46 | 125 |
| 6 | 1518 | 124.9 | 0.512 | 1563 | 0.817 | 2.08 | 0.47 | 128 |
| 7 | 1536 | 133.6 | 0.513 | 1595 | 0.819 | 2.07 | 0.48 | 115 |
| 8 | 1541 | 132.8 | 0.518 | 1599 | 0.816 | 2.05 | 0.49 | 113 |
| 9 | 1545 | 134.1 | 0.514 | 1603 | 0.831 | 2.25 | 0.47 | 121 |
| 10 | 1531 | 134.1 | 0.512 | 1592 | 0.816 | 2.04 | 0.47 | 114 |
| 11 | 1538 | 133.1 | 0.517 | 1596 | 0.813 | 2.01 | 0.48 | 112 |
| 12 | 1541 | 133.9 | 0.512 | 1601 | 0.832 | 2.26 | 0.47 | 119 |
| 13 | 1539 | 134.5 | 0.510 | 1597 | 0.818 | 2.10 | 0.48 | 128 |
| 14 | 1548 | 133.8 | 0.513 | 1605 | 0.817 | 2.02 | 0.50 | 119 |
| 15 | 1539 | 133.2 | 0.512 | 1598 | 0.814 | 2.00 | 0.49 | 116 |

TABLE 2

| Comp. Example | Particle characteristics | | | Tape characteristics | | | | |
|---|---|---|---|---|---|---|---|---|
| | Hc (Oe) | σs (emu/g) | Rs | Hc (Oe) | SQ | OR | SFD | Gloss |
| 1 | 1442 | 124.0 | 0.495 | 1496 | 0.781 | 1.79 | 0.55 | 100 |
| 2 | 1372 | 134.1 | 0.490 | 1408 | 0.720 | 1.41 | 0.67 | 66 |
| 3 | 1370 | 133.5 | 0.484 | 1415 | 0.758 | 1.61 | 0.65 | 83 |
| 4 | 1551 | 122.8 | 0.508 | 1610 | 0.781 | 1.70 | 0.55 | 87 |
| 5 | 1442 | 130.3 | 0.491 | 1501 | 0.781 | 1.78 | 0.64 | 81 |
| 6 | 1498 | 129.8 | 0.498 | 1556 | 0.798 | 1.88 | 0.58 | 96 |
| 7 | 1467 | 129.4 | 0.486 | 1529 | 0.774 | 1.73 | 0.61 | 85 |

According to the present invention, the particle sintering and the deformation of particle configuration can be suppressed without causing the difficulties encountered in the thermal dehydration treatment and thermal reduction treatment accompanied by the prior art coating treatment with the conventional shape-retaining agents. The process of the present invention enables the production of fine magnetic metal particles having a good dispersibility in magnetic recording mediums and being suitable for high density recording so that it is very advantageous in industry.

What is claimed is:

1. A process for producing acicular magnetic iron particles comprising the steps of firstly coating the surfaces of hydrated iron oxide particles with at least one material selected from the group consisting of aluminum compounds and zirconium compounds, then heating the coated particles to convert to hematite particles, thereafter secondly coating the resultant hematite particles with at least one aluminum compound, and then reducing under heat the coated hematite particles.

2. The process for producing acicular magnetic iron particles according to claim 1, wherein the first coating material includes additionally at least one of silicon compounds, phosphorus compounds and boron compounds.

3. The process for producing acicular magnetic iron particles according to claim 2, wherein the aluminum compounds are selected from the group consisting of acidic aluminum salts, basic aluminum salts, organic aluminum compounds and alumina sol; the zirconium compounds are selected from the group consisting of zirconium oxycarbonate, zirconyl ammonium carbonate, zirconium oxychloride, zirconium oxysulfate, zirconium acetate, zirconium stearate, zirconium tetra-n-butoxide and zirconium acetylacetate; the silicon compounds are selected from the group consisting of sodium orthosilicate, sodium metasilicate and water glass; the phosphorus compounds are selected from the group consisting of phosphoric acid, polyphosphoric acid, sodium phosphate and sodium polyphosphate; and the boron compounds are selected from the group consisting of boric acid and sodium borate.

4. The process for producing acicular magnetic iron particles according to claim 1, wherein when the first coating material includes zirconium compounds, the second coating material includes additionally at least one of silicon compounds, phosphorus compounds, zirconium compounds and boron compounds.

5. The process for producing acicular magnetic iron particles according to claim 3 wherein the aluminum compounds are selected from the group consisting of acidic aluminum salts, basic aluminum salts, organic aluminum compounds and alumina sol; the zirconium compounds are selected from the group consisting of zirconium oxycarbonate, zirconyl ammonium carbonate, zirconium oxychloride, zirconium oxysulfate, zirconium acetate, zirconium stearate, zirconium tetra-n-butoxide and zirconium acetylacetate; the silicon compounds are selected from the group consisting of sodium orthosilicate, sodium metasilicate and water glass; the phosphorus compounds are selected from the group consisting of phosphoric acid, polyphosphoric acid, sodium phosphate and sodium polyphosphate; and the boron compounds are selected from the group consisting of boric acid and sodium borate.

6. The process for producing acicular magnetic iron particles according to claim 1, wherein when the first coating material includes only zirconium compounds, the second coating material includes additionally at least one of silicon compounds, phosphorus compounds, zirconium compounds and boron compounds.

7. The process for producing acicular magnetic iron particles according to claim 6 wherein the aluminum compounds are selected from the group consisting of acidic aluminum salts, basic aluminum salts, organic aluminum compounds and alumina sol; the zirconium compounds are selected from the group consisting of zirconium oxycarbonate, zirconyl ammonium carbonate, zirconium oxychloride, zirconium oxysulfate, zirconium acetate, zirconium stearate, zirconium tetra-n-butoxide and zirconium acetylacetate; the silicon compounds are selected from the group consisting of sodium orthosilicate, sodium metasilicate and water glass; the phosphorus compounds are selected from the group consisting of phosphoric acid, polyphosphoric acid, sodium phosphate and sodium polyphosphate; and the boron compounds are selected from the group consisting of boric acid and sodium borate.

8. The process for producing acicular magnetic iron particles according to claim 1, wherein the amount of aluminum (Al) and zirconium (Zr) deposited in the first coating treatment is in the range of 0.1 to 10% by weight based on the amount of iron (Fe) in the hydrated iron oxide particles.

9. The process for producing acicular magnetic iron particles according to claim 1, wherein the amount of aluminum (Al) deposited in the second coating treatment is in the range of 0.1 to 10% by weight based on the amount of iron (Fe) in the hematite particles.

10. The process for producing acicular magnetic iron particles according to claim 1, wherein the amount of aluminum (Al) deposited in the second coating treatment is in the range of 0.1 to 8% by weight based on the amount of iron (Fe) in the hematite particles.

11. The process for producing acicular magnetic iron particles according to claim 1, wherein the amount of aluminum (Al) deposited in the second coating step relative to the amount of iron (Fe) in the hematite particles is in the range of 5 to 95% by weight based on the total of the amount of all the metal elements deposited on the hydrated iron oxide particles in the first coating step and the amount of all the metal elements deposited on the hematite particles in the second coating step.

12. The process for producing acicular magnetic iron particles according to claim 1, wherein the hydrated iron oxide particles which have been subjected to the first coating treatment are heated at a temperature of 350 to 800° C. in a non-reducing atmosphere.

13. The process for producing acicular magnetic iron particles according to claim 1, wherein the coated hematite particles are heated at a temperature of 300 to 850° C. before the reducing under heat.

14. The process for producing acicular magnetic iron particles according to claim 1, wherein the hydrated iron oxide particles contain at least one element selected from the group consisting of cobalt, nickel, copper, silver, phosphorus, zinc, manganese, magnesium, boron, aluminum and silicon.

15. The process for producing acicular magnetic iron particles according to claim 1, wherein the aluminum compounds are selected from the group consisting of acidic aluminum salts, basic aluminum salts, organic aluminum compounds and alumina sol; and the zirconium compounds are selected from the group consisting of zirconium oxycarbonate, zirconyl ammonium carbonate, zirconium oxychloride, zirconium oxysulfate, zirconium acetate, zirconium stearate, zirconium tetra-n-butoxide and zirconium acetylacetate.

16. The process for producing acicular magnetic iron particles according to claim 15, wherein the acidic aluminum salts are selected from the group consisting of aluminum sulfate, aluminum chloride and aluminum acetate.

17. The process for producing acicular magnetic iron particles according to claim 15, wherein the basic aluminum salt consists of sodium aluminate.

18. The process for producing acicular magnetic iron particles according to claim 15, wherein the organic aluminum compounds are selected from the group consisting of aluminum alkoxide and alkyl aluminum.

* * * * *